(12) United States Patent
Brackett et al.

(10) Patent No.: US 8,429,182 B2
(45) Date of Patent: Apr. 23, 2013

(54) POPULATING A TASK DIRECTED COMMUNITY IN A COMPLEX HETEROGENEOUS ENVIRONMENT BASED ON NON-LINEAR ATTRIBUTES OF A PARADIGMATIC COHORT MEMBER

(75) Inventors: Paul L. Brackett, East Lyme, CT (US); Robert R. Friedlander, Southbury, CT (US); Anne O. Jackson, Newton, MA (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 12/903,376

(22) Filed: Oct. 13, 2010

(65) Prior Publication Data
US 2012/0096032 A1    Apr. 19, 2012

(51) Int. Cl.
*G06F 7/00* (2006.01)

(52) U.S. Cl.
USPC .......... 707/758; 707/769; 707/780; 705/7.11; 705/7.13; 706/45; 706/52

(58) Field of Classification Search .................. 707/758, 707/769, 780; 705/7.11, 7.13; 706/45, 52
See application file for complete search history.

(56) References Cited

U.S. PATENT DOCUMENTS

| | | | |
|---|---|---|---|
| 4,890,227 A | 12/1989 | Watanabe et al. | |
| 5,070,453 A | 12/1991 | Duffany | |
| 5,111,391 A | 5/1992 | Fields et al. | |
| 5,128,871 A | 7/1992 | Schmitz | |
| 5,148,365 A | 9/1992 | Dembo | |
| 5,216,593 A | 6/1993 | Dietrich et al. | |
| 5,764,740 A | 6/1998 | Holender | |
| 5,838,918 A | 11/1998 | Prager et al. | |
| 5,880,598 A | 3/1999 | Duong | |
| 6,021,403 A | 2/2000 | Horvitz et al. | |
| 6,049,776 A | 4/2000 | Donnelly et al. | |
| 6,076,166 A | 6/2000 | Moshfeghi et al. | |
| 6,102,856 A | 8/2000 | Groff et al. | |
| 6,164,975 A | 12/2000 | Weingarden et al. | |
| 6,212,524 B1 | 4/2001 | Weissman et al. | |
| 6,272,483 B1 | 8/2001 | Joslin et al. | |
| 6,289,340 B1 | 9/2001 | Puram et al. | |
| 6,321,207 B1 | 11/2001 | Ye | |
| 6,449,641 B1 | 9/2002 | Moiin et al. | |

(Continued)

OTHER PUBLICATIONS

U.S. Appl. No. 13/253,431, Specification filed Oct. 5, 2011.

(Continued)

*Primary Examiner* — Shew-Fen Lin
*Assistant Examiner* — Jieying Tang
(74) *Attorney, Agent, or Firm* — John R. Pivnichny; Law Office of Jim Boice (57) ABSTRACT

A computer implemented method, system, and/or computer program product defines a paradigmatic member of a first task directed community. Non-linear attributes of each member of the first task directed community having a first agenda are identified. Each of the non-linear attributes is individually unrelated to the first agenda. Common non-linear attributes shared by multiple members of the first task directed community are identified for use in defining the paradigmatic member of the first task directed community. A second task directed community, which has an agenda that substantially matches the first agenda of the first task directed community, is then presented with candidate members that match the paradigmatic member of the first task directed community.

19 Claims, 5 Drawing Sheets

U.S. PATENT DOCUMENTS

| | | |
|---|---|---|
| 6,484,155 B1 | 11/2002 | Kiss et al. |
| 6,578,068 B1 | 6/2003 | Bowman-Amuah |
| 6,604,160 B1 | 8/2003 | Le et al. |
| 6,647,374 B2 | 11/2003 | Kansal |
| 6,675,159 B1 | 1/2004 | Lin et al. |
| 6,905,816 B2 | 6/2005 | Jacobs et al. |
| 6,937,147 B2 | 8/2005 | Dilbeck et al. |
| 6,954,736 B2 | 10/2005 | Menninger et al. |
| 7,181,428 B2 | 2/2007 | Lawrence |
| 7,213,009 B2 | 5/2007 | Pestotnik et al. |
| 7,295,925 B2 | 11/2007 | Breed et al. |
| 7,343,316 B2 | 3/2008 | Goto et al. |
| 7,400,257 B2 | 7/2008 | Rivas |
| 7,403,922 B1 | 7/2008 | Lewis et al. |
| 7,457,764 B1 | 11/2008 | Bullock et al. |
| 7,460,019 B2 | 12/2008 | Henderson |
| 7,464,147 B1 | 12/2008 | Fakhouri et al. |
| 7,516,142 B2 | 4/2009 | Friedlander et al. |
| 7,523,118 B2 | 4/2009 | Friedlander et al. |
| 7,539,623 B1 | 5/2009 | Wyatt |
| 7,558,745 B2 | 7/2009 | Cullen et al. |
| 7,584,160 B2 | 9/2009 | Friedlander et al. |
| 7,630,948 B2 | 12/2009 | Friedlander et al. |
| 7,630,986 B1* | 12/2009 | Herz et al. ............ 707/999.002 |
| 7,647,288 B2 | 1/2010 | Friedlander et al. |
| 7,693,736 B1 | 4/2010 | Chu et al. |
| 7,702,605 B2 | 4/2010 | Friedlander et al. |
| 7,739,606 B2 | 6/2010 | Sawada et al. |
| 7,752,154 B2 | 7/2010 | Friedlander et al. |
| 7,801,885 B1 | 9/2010 | Verma |
| 7,930,262 B2 | 4/2011 | Friedlander et al. |
| 7,933,228 B2 | 4/2011 | Coley |
| 8,001,008 B2 | 8/2011 | Engle |
| 8,010,516 B2 | 8/2011 | Ishii et al. |
| 8,055,603 B2 | 11/2011 | Angell et al. |
| 8,204,779 B1 | 6/2012 | Hughes et al. |
| 2001/0034632 A1 | 10/2001 | Wilkinson |
| 2002/0019764 A1 | 2/2002 | Mascarenhas |
| 2002/0052756 A1 | 5/2002 | Lomangino |
| 2002/0059201 A1 | 5/2002 | Work |
| 2002/0107824 A1 | 8/2002 | Ahmed et al. |
| 2002/0111922 A1 | 8/2002 | Young et al. |
| 2002/0115447 A1 | 8/2002 | Martin et al. |
| 2002/0182573 A1 | 12/2002 | Watson |
| 2003/0033180 A1 | 2/2003 | Shekar et al. |
| 2003/0065544 A1 | 4/2003 | Elzinga et al. |
| 2003/0088491 A1 | 5/2003 | Liu et al. |
| 2003/0097291 A1 | 5/2003 | Freedman |
| 2003/0140063 A1 | 7/2003 | Pizzorno et al. |
| 2003/0177038 A1 | 9/2003 | Rao |
| 2003/0220830 A1 | 11/2003 | Myr |
| 2003/0220860 A1 | 11/2003 | Heytens et al. |
| 2004/0006694 A1 | 1/2004 | Heelan et al. |
| 2004/0122787 A1 | 6/2004 | Avinash et al. |
| 2004/0243422 A1 | 12/2004 | Weber et al. |
| 2004/0267595 A1 | 12/2004 | Woodings et al. |
| 2005/0004823 A1 | 1/2005 | Hnatio |
| 2005/0004828 A1 | 1/2005 | deSilva et al. |
| 2005/0038608 A1 | 2/2005 | Chandra et al. |
| 2005/0080806 A1 | 4/2005 | Doganata et al. |
| 2005/0101873 A1 | 5/2005 | Misczynski et al. |
| 2005/0144062 A1 | 6/2005 | Mittal et al. |
| 2005/0149466 A1 | 7/2005 | Hale et al. |
| 2005/0165594 A1 | 7/2005 | Chandra et al. |
| 2005/0198486 A1 | 9/2005 | Desmond et al. |
| 2005/0222989 A1 | 10/2005 | Haveliwala et al. |
| 2005/0240668 A1 | 10/2005 | Rolia et al. |
| 2006/0010090 A1 | 1/2006 | Brockway et al. |
| 2006/0031110 A1* | 2/2006 | Benbassat et al. ................ 705/9 |
| 2006/0036560 A1 | 2/2006 | Fogel |
| 2006/0069514 A1 | 3/2006 | Chow et al. |
| 2006/0105830 A1 | 5/2006 | Nemitz et al. |
| 2006/0155627 A1 | 7/2006 | Horowitz |
| 2006/0184412 A1 | 8/2006 | Kagan et al. |
| 2006/0194186 A1* | 8/2006 | Nanda ........................... 434/350 |
| 2006/0200435 A1 | 9/2006 | Flinn et al. |
| 2006/0218010 A1 | 9/2006 | Michon et al. |
| 2006/0226991 A1 | 10/2006 | Rivas |
| 2006/0294085 A1 | 12/2006 | Rose et al. |
| 2007/0073654 A1 | 3/2007 | Chow et al. |
| 2007/0073754 A1 | 3/2007 | Friedlander et al. |
| 2007/0073799 A1 | 3/2007 | Adjali et al. |
| 2007/0112735 A1 | 5/2007 | Holloway et al. |
| 2007/0150325 A1 | 6/2007 | Bjornson |
| 2007/0168307 A1* | 7/2007 | Floudas et al. .................. 706/19 |
| 2007/0174090 A1 | 7/2007 | Friedlander et al. |
| 2007/0174091 A1 | 7/2007 | Friedlander et al. |
| 2007/0174101 A1 | 7/2007 | Li et al. |
| 2007/0179356 A1 | 8/2007 | Wessel |
| 2007/0185737 A1 | 8/2007 | Friedlander et al. |
| 2007/0203872 A1 | 8/2007 | Flinn et al. |
| 2007/0244701 A1 | 10/2007 | Erlanger et al. |
| 2007/0274337 A1 | 11/2007 | Purpura |
| 2008/0015871 A1 | 1/2008 | Eder |
| 2008/0028409 A1 | 1/2008 | Cherkasova et al. |
| 2008/0065576 A1 | 3/2008 | Friedlander et al. |
| 2008/0077463 A1 | 3/2008 | Friedlander et al. |
| 2008/0082356 A1 | 4/2008 | Friedlander et al. |
| 2008/0082374 A1 | 4/2008 | Kennis et al. |
| 2008/0147694 A1 | 6/2008 | Ernest et al. |
| 2008/0155104 A1 | 6/2008 | Quinn et al. |
| 2008/0167929 A1* | 7/2008 | Cao et al. ........................ 705/8 |
| 2008/0172352 A1 | 7/2008 | Friedlander et al. |
| 2008/0177687 A1 | 7/2008 | Friedlander et al. |
| 2008/0177688 A1 | 7/2008 | Friedlander et al. |
| 2008/0189402 A1 | 8/2008 | Betzler et al. |
| 2008/0208801 A1 | 8/2008 | Friedlander et al. |
| 2008/0208813 A1 | 8/2008 | Friedlander et al. |
| 2008/0208814 A1 | 8/2008 | Friedlander et al. |
| 2008/0208832 A1 | 8/2008 | Friedlander et al. |
| 2008/0208838 A1 | 8/2008 | Friedlander et al. |
| 2008/0208875 A1* | 8/2008 | Friedlander et al. .......... 707/100 |
| 2008/0208901 A1 | 8/2008 | Friedlander et al. |
| 2008/0208902 A1 | 8/2008 | Friedlander et al. |
| 2008/0208903 A1 | 8/2008 | Friedlander et al. |
| 2008/0208904 A1 | 8/2008 | Friedlander et al. |
| 2008/0209493 A1 | 8/2008 | Choi et al. |
| 2008/0246629 A1 | 10/2008 | Tsui et al. |
| 2008/0281974 A1 | 11/2008 | Slothouber et al. |
| 2008/0288862 A1 | 11/2008 | Smetters et al. |
| 2008/0294459 A1 | 11/2008 | Angell et al. |
| 2008/0294692 A1 | 11/2008 | Angell et al. |
| 2009/0024553 A1 | 1/2009 | Angell et al. |
| 2009/0106179 A1 | 4/2009 | Friedlander et al. |
| 2009/0112670 A1 | 4/2009 | Black et al. |
| 2009/0138300 A1 | 5/2009 | Kagan et al. |
| 2009/0198733 A1 | 8/2009 | Gounares et al. |
| 2009/0287503 A1 | 11/2009 | Angell et al. |
| 2009/0287674 A1 | 11/2009 | Bouillet et al. |
| 2009/0287683 A1 | 11/2009 | Bennett |
| 2009/0299766 A1 | 12/2009 | Friedlander et al. |
| 2009/0299928 A1 | 12/2009 | Kongtcheu |
| 2010/0010832 A1 | 1/2010 | Boute et al. |
| 2010/0042456 A1 | 2/2010 | Stinchcombe et al. |
| 2010/0063877 A1 | 3/2010 | Soroca et al. |
| 2010/0077438 A1 | 3/2010 | Ansari |
| 2010/0131028 A1 | 5/2010 | Hsu et al. |
| 2010/0191516 A1 | 7/2010 | Benish et al. |
| 2010/0223581 A1* | 9/2010 | Manolescu et al. ........... 715/853 |
| 2010/0228715 A1 | 9/2010 | Lawrence |
| 2011/0054968 A1 | 3/2011 | Galaviz |
| 2011/0093287 A1 | 4/2011 | Dicks et al. |
| 2011/0275907 A1 | 11/2011 | Inciardi et al. |
| 2012/0108984 A1 | 5/2012 | Bennett et al. |

OTHER PUBLICATIONS

U.S. Appl. No. 12/875,261, Specification filed Sep. 3, 2010.

U.S. Appl. No. 13/253,431—Non-Final Office Action Mailed Nov. 10, 2011.

U.S. Appl. No. 12/884,665, Specification filed Sep. 17, 2010.

U.S. Appl. No. 12/884,665—Non-Final Office Action Mailed Apr. 11, 2012.

U.S. Appl. No. 12/851,995, Specification filed Aug. 6, 2010.

U.S. Appl. No. 12/875,261—Non-Final Office Action Mailed Feb. 14, 2012.

Friedlander et al., U.S. Appl. No. 12/795,847, "Probabilistic Optimization of Resource Discovery, Reservation and Assignment", filed Jun. 8, 2010.

T. Vercauteren et al., "Hierarchical Forecasting of Web Server Workload Using Sequential Monte Carlo Training", IEEE Transactions on Signal Processing, vol. 55, No. 4, pp. 1286-1297, Apr. 2007.

P. Palazzari et al., "Synthesis of Pipelined Systems for the Contemporaneous Execution of Periodic and Aperiodic Tasks With Hard Real-Time Constraints", 18th International Parallel and Distributed Processing Symposium, 121. IEEE Comput. Soc, Los Alamitos, CA, USA, 2004, pp. LVI-289.

RL Dillon et al., "Optimal Use of Budget Reserves to Minimize Technical and Management Failure Risks During Complex Project Development", IEEE Transactions on Engineering Management, vol. 52, No. 3, pp. 382-395, Aug. 2005.

K. Vanthournout et al., "A Taxonomy for Resource Discovery", Pers Ubiquit Comput 9, pp. 81-89, 2005.

C. Srisuwanrat et al., "Optimal Scheduling of Probabilistic Repetitive Projects Using Completed Unit and Genetic Algorithms", Proceedings of the 2007 Winter Simulation Conference, pp. 2151-2158, 2007.

S. Bharathi et al., "Scheduling Data-Intensive Workflows on Storage Constrained Resources", Works 09, Portland, OR, pp. 1-10 Nov. 15, 2009.

J. Redondo et al., "Solving the Multiple Competitive Facilities Location and Design Problem on the Plane", Massachusetts Institute of Technology, Evolutionary Computation, vol. 17, No. 1, pp. 21-53, 2009.

H. Van et al., "Autonomic Virtual Resource Management for Service Hosting Platforms", Cloud'09, pp. 1-8 , May 23, 2009.

U.S. Appl. No. 12/795,847, Specification filed Jun. 8, 2010.

Schadow et al., "Discussion Paper: Privacy-Preserving Distributed Queries for a Clinical Case Research Network," IEE International Conference on Data Mining Workshop on Privacy, Security, and Data Mining, 2002 (Abstract).

U.S. Appl. No. 12/875,261—Notice of Allowance Mailed Sep. 27, 2012.

Phillip E. Hayes et al., "Picking Up the Pieces: Utilizing Disaster Recovery Project Management to Improve Readiness and Response Time," IEEE Industry Applications Magazine, Nov./Dec. 2002, pp. 1-10 (Abstract).

Kun Wang et al., "A Mathematical Approach to Disaster Recovery Planning," Proceedings of the First International Conference on Semantics, Knowledge, and Grid, 2005, pp. 1-3 (Abstract).

E. A. Silver, "An Overview of Heuristic Solution Methods," The Journal of the Operational Research Society, vol. 55, No. 9, Sep. 2004, pp. 936-956 (Abstract).

Smith et al., "Collaborative Approaches to Research," HEFCE Fundamental Review of Research Policy and Planning, Final Report, Apr. 2000, pp. 1-117.

William E. Souder, "Analytical Effectiveness of Mathematical Models for R&D Project Selection," Management Science, vol. 19, No. 8, Application Seires, Apr. 1973, pp. 907-923 (Abstract).

J. Altmann et al., "Cooperative Software Development: Concepts, Model and Tools," Technology of Object-Oriented Languages and Systems, 1999, pp. 1-14.

Shou-Qi Cao et al., "Research on Resource Scheduling for Development Process of Complicated Product," Computer Supported Cooperative Work in Design, 2005. Proceedings of the Ninth International Conference on, vol. 1, pp. 229-233 (Abstract).

Ming Chen et al., "Research on Organization Method of Development Activities for Complicated Product," Computer Supported Cooperative Work in Design, 2005. Proceedings of the Ninth International Conference on, vol. 1, pp. 234-239 (Abstract).

Luckham et al., "Event Processing Glossary," Jul. 2008, pp. 1-19. http://complexevents.com.

Dept of Health and Human Services Agency for Healthcare Research and Quality, "AHRQ Quality Indicators—Patient Safety Indicators—Technical Specifications," 2012, p. 1-149. http://www.qualityindicators.ahrq.gov.

Wong et al., "Rule-Based Anomaly Pattern Detection for Detecting Disease Outbreaks," AAAI-02 Proceedings, 2002, pp. 1-7.

Grzymala-Busse, "Knowledge Acquisition Under Uncertainty—A Rough Set Approach," Journal of Intelligent and Robotic Systems, 1988 (Abstract).

U.S. Appl. No. 12/851,995—Non-Final Office Action Mailed Apr. 25, 2012.

U.S. Appl. No. 12/884,665—Final Office Action Mailed Oct. 18, 2012.

U.S. Appl. No. 12/795,847—Non-Final Office Action Mailed Nov. 26, 2012.

U.S. Appl. No. 12/851,995—Final Office Action Mailed Nov. 8, 2012.

U.S. Appl. No. 13/253,431—Non-Final Office Action Mailed Jan. 3, 2013.

* cited by examiner

FIG. 1

| MEMBER I | MEMBER II | MEMBER III | MEMBER IV |
|---|---|---|---|
| NON-LINEAR ATTRIBUTE 1 | NON-LINEAR ATTRIBUTE 5 | NON-LINEAR ATTRIBUTE 1 | NON-LINEAR ATTRIBUTE 5 |
| NON-LINEAR ATTRIBUTE 2 | NON-LINEAR ATTRIBUTE 2 | NON-LINEAR ATTRIBUTE 2 | NON-LINEAR ATTRIBUTE 1 |
| NON-LINEAR ATTRIBUTE 3 | NON-LINEAR ATTRIBUTE 3 | NON-LINEAR ATTRIBUTE 3 | NON-LINEAR ATTRIBUTE 3 |
| NON-LINEAR ATTRIBUTE 4 | NON-LINEAR ATTRIBUTE 6 | NON-LINEAR ATTRIBUTE 7 | NON-LINEAR ATTRIBUTE 4 |

POPULATING A TASK DIRECTED COMMUNITY IN A COMPLEX HETEROGENEOUS ENVIRONMENT BASED ON NON-LINEAR ATTRIBUTES OF A PARADIGMATIC COHORT MEMBER

BACKGROUND

The present disclosure relates to the field of computers, and specifically to the use of computers in allocating human resources. Still more particularly, the present disclosure relates to the use of computers in allocating human resources through the use of non-linear attributes of paradigmatic cohort members. In one embodiment, the present disclosure operates within the environment of computerized databases.

BRIEF SUMMARY

A computer implemented method, system, and/or computer program product defines a paradigmatic member of a first task directed community. Non-linear attributes of each member of the first task directed community having a first agenda are identified. Each of the non-linear attributes is individually unrelated to the first agenda. Common non-linear attributes shared by multiple members of the first task directed community are identified for use in defining a paradigmatic member of the first task directed community. A second task directed community, which has an agenda that substantially matches the first agenda of the first task directed community, is then presented with candidate members that match the paradigmatic member of the first task directed community.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
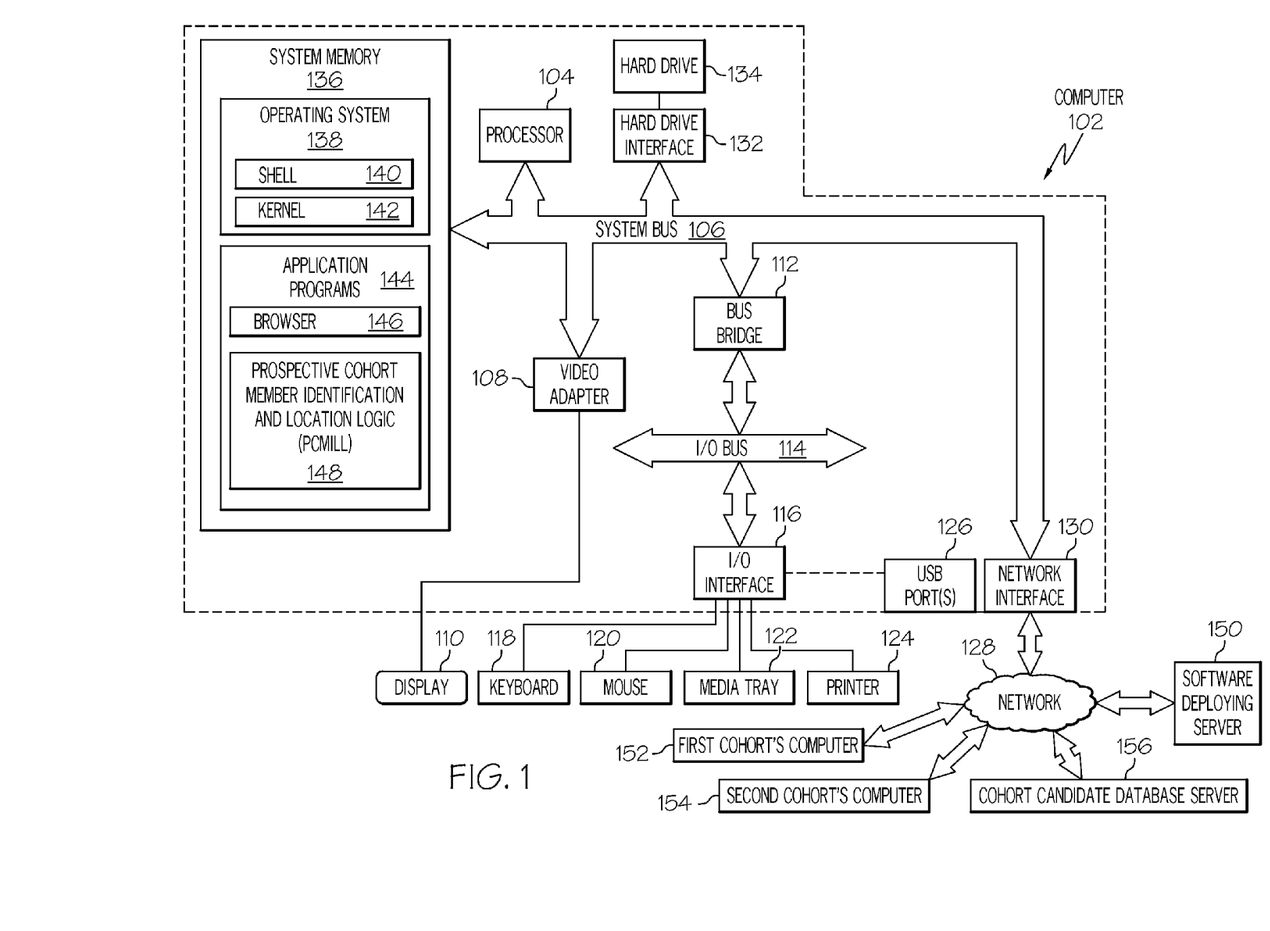
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, a first cohort's computer 152, a second cohort's computer 154, and/or a cohort candidate database server 156.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a prospective cohort member identification and location logic (PCMILL) 148. PCMILL 148 includes code for implementing the processes described below, including those described in FIGS. 2-5. In one embodiment, computer 102 is able to download PCMILL 148 from software deploying server 150, including in an on-demand basis, wherein the code in PCMILL 148 is not downloaded until needed for execution to define and/or implement the improved enterprise architecture described herein. Note further that, in one embodiment of the present invention, software deploying server 150 performs all of the functions associated with the present invention (including execution of PCMILL 148), thus freeing computer 102 from having to use its own internal computing resources to execute PCMILL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
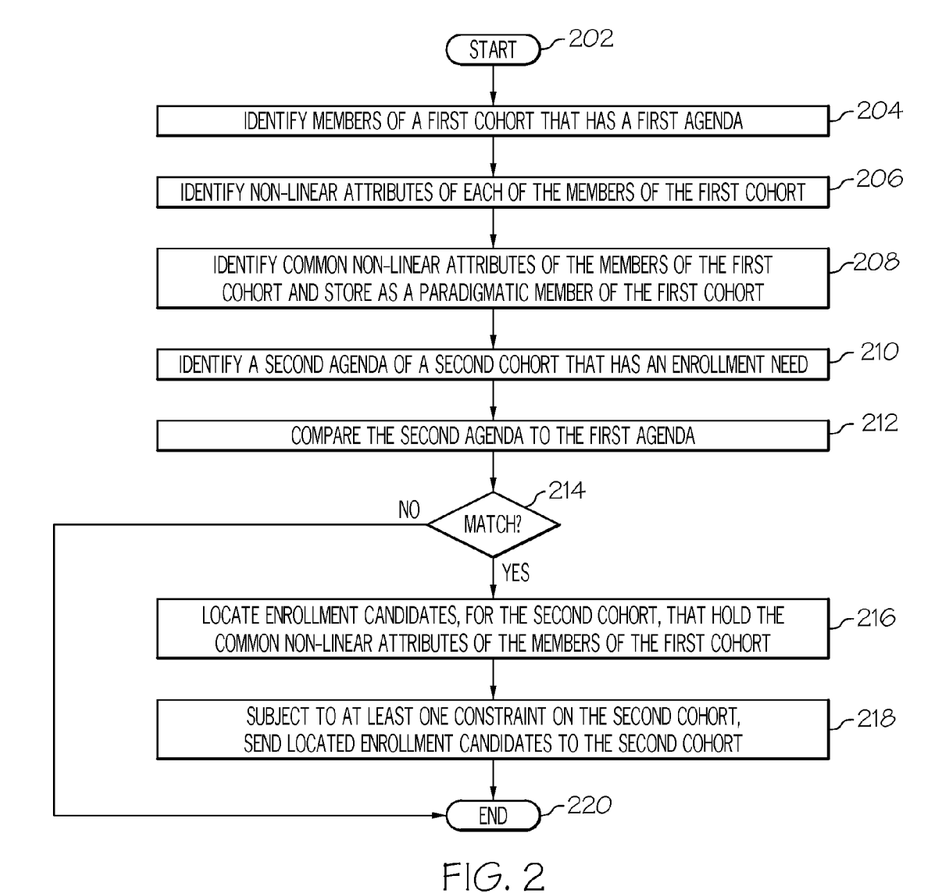
FIG. 2 is a high level flow chart of one or more steps taken by a processor to create and store a paradigmatic member of a first cohort for use in populating a second cohort.

Referring now to FIG. 2, a high level flow chart of one or more steps taken by a processor to create and store a paradigmatic member of a first cohort is presented. After initiator block 202, members of a first cohort, which has a known first agenda, are identified (block 204). One example of a cohort, including this first cohort, is a task directed community, such as a political action group, a community services group, a social club, etc. The known first agenda may be deduced from the cohort's mission statement, press releases, affiliation with other organizations, websites, publications, contributions, conferences, etc. For example, assume that the first cohort (task directed community) is a highway beautification club that is dedicated to picking up garbage from public highways. The members can be identified by a membership roster of the club. If the club is more loosely organized, then members can be identified by mass e-mailings from a leader of the club, mailing lists, web-posted sign-in sheets to meetings, etc.

As described in block 206, non-linear attributes of each member of the cohort are identified and supplied by a computer, such as the first cohort's computer 152 shown in FIG. 1, as received from an attribute source, which may be part of first cohort's computer 152 or may be from a remote source, such as a database, a cloud, the Internet, etc. These non-linear attributes are defined as attributes that, individually, are logically unrelated to the known first agenda of the cohort. For example, assume that a member of the highway beautification club has the following attributes: 1) a college degree; 2) a subscription to a national newspaper; 3) at least one dependant; and 4) an annual income of less than $40,000/year.

There is no logical nexus between any or all of these attributes and the fact that this person is a member of a cohort devoted to highway beautification. Nonetheless, if one or more such non-linear attributes are shared by members of the first cohort, then a paradigmatic member can be defined based on these non-linear attributes and at least one constraint. This paradigmatic member is defined as a modeled person that has an interest/capacity/ability to be a participating member of that first cohort (or a similar cohort having a similar agenda/constraints), subject to a specific combination of non-linear attributes and at least one constraint.

A constraint is a requirement of the cohort itself. Exemplary constraints are that members live within a predefined geographical area (i.e., within a predetermined radius of a meeting location of the cohort), that each member has some predetermined license/credential necessary for participating in the activities of the cohort, that the members are all over a certain age, etc. Thus, once a candidate member is identified based on his having similar non-linear attributes (which are unrelated to the agenda of the cohort) as the paradigmatic member, then this candidate member may be further filtered out based on the linear constraints of the cohort itself.

In order to determine what describes a paradigmatic member based on known members of the cohort, in one embodiment a Bayesian analysis is used. This Bayesian analysis assumes that a new candidate member for either the first cohort or a second (but similar) cohort is being considered for membership. For example, assume that A represents the event that a candidate being considered will be a good member of a second cohort that is similar to a first cohort, and B represents the event that the candidate has the same attributes as a paradigmatic member of the first cohort. This results in the Bayesian probability formula of:

$$P(A \mid B) = \frac{P(B \mid A) * P(A)}{P(B)}$$

where:
P(A|B) is the probability that a candidate person will be a good member of a similar cohort (A) given that (I) the new person has the same attributes as the paradigmatic member (B);
P(B|A) is the probability that a known member of the first cohort has the same attributes as the paradigmatic member;
P(A) is probability that the candidate person will be a good member of the second cohort regardless of any other information; and
P(B) is the probability that the new person will have the same attributes as the paradigmatic member regardless of any other information.

Figure 3:
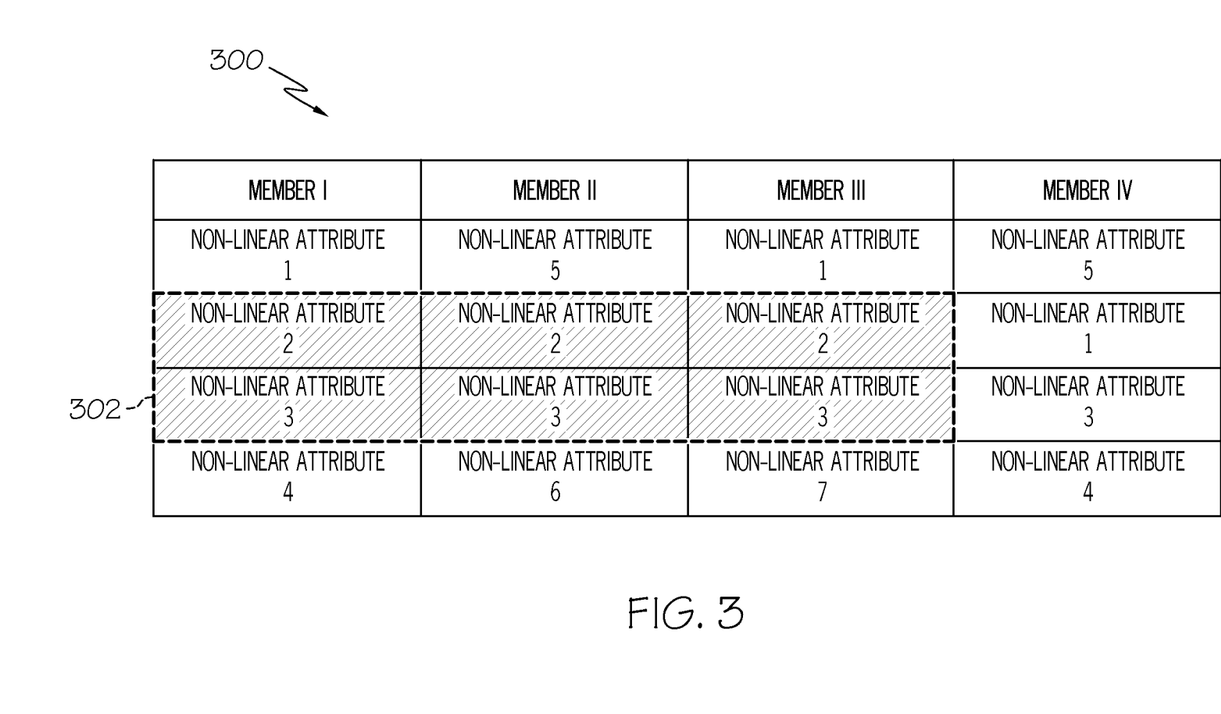
FIG. 3 and FIG. 4 illustrate exemplary sets of attributes for known members in a first cohort.

For example, assume that three out of four members (Members I-IV) of the first cohort have the same attributes as a paradigmatic member that has been defined as holding Attributes 2-3, as shown in section 302 of Table 300 shown in FIG. 3. Thus, P(B|A)=3 out of 4=0.75. Assume also that the odds that the new person will be a good member of the first or second similar cohort regardless of any other information (P(A)) is 0.10, and that the probability that the new person will have the same attributes (Attributes 1 and 2) as the paradigmatic member regardless of any other information (P(B)) is 0.12. The probability that a candidate person will be a good member of the similar second cohort given that the candidate person has the same attributes as the paradigmatic member is 62%:

$$P(A \mid B) = \frac{.75 * .10}{.12} = .62$$

Figure 4:
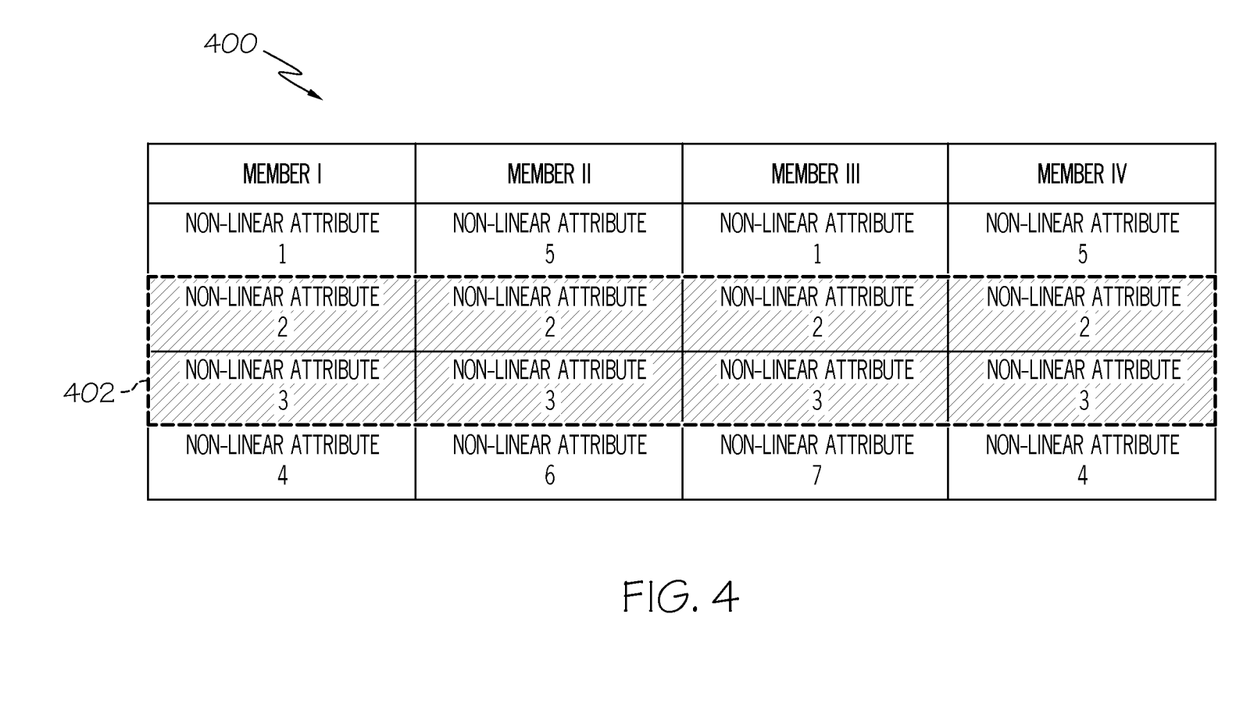
Figure 5:
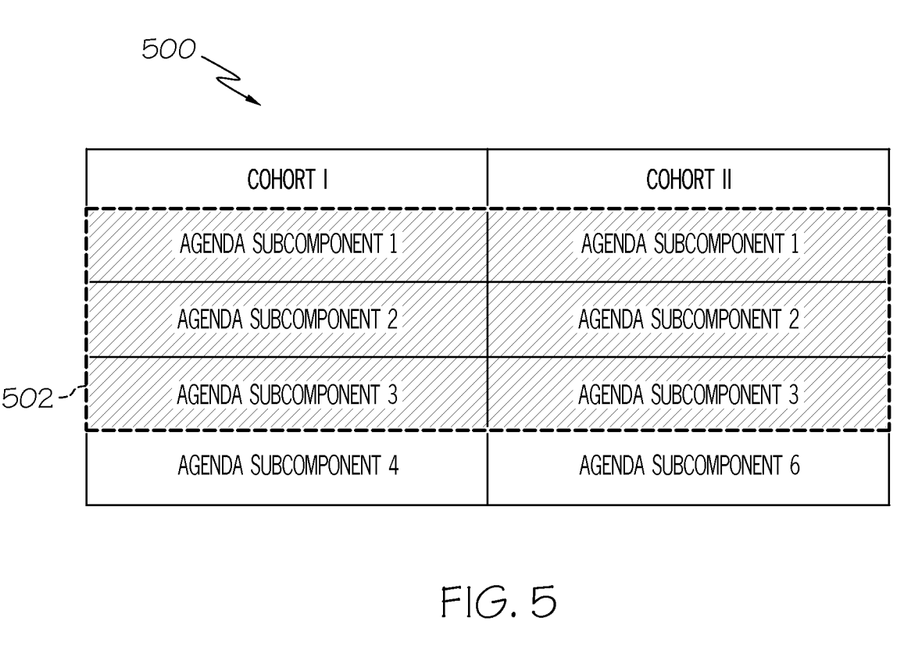
FIG. 5 is a table that describes two cohorts that share agenda subcomponents.

However, if all four members of the first cohort held the same attributes as the paradigmatic member (P(B|A)=1.0), as shown in section 402 of Table 400 shown in FIG. 4, then the probability that a candidate person will be a good member of the similar second cohort, given that the candidate person has the same attributes as the paradigmatic member, is now 83%:

$$P(A \mid B) = \frac{1.0 * .10}{.12} = .83$$

Thus, shared non-linear attributes among more members increases the accuracy of describing a paradigmatic member. Similarly, an increase in the number of shared attributes among members also increases the accuracy of describing a paradigmatic member (P(A|B)), since members of the first cohort sharing more attributes causes a decrease in the probability that a candidate person (for the first cohort or the similar second cohort) will have the same attributes as the paradigmatic member regardless of any other information (P(B)). Therefore, in one embodiment, a minimum number of common non-linear attributes for members of the first cohort are defined, such that the definition of the paradigmatic member is limited to a person holding at least the defined minimum number of common non-linear attributes.

Returning to FIG. 2, once the paradigmatic member is defined, this paradigmatic member is mapped to the common non-linear attributes of members of the first cohort and the constraint of the first cohort, and is stored for future use (block 208) in either a local computer (e.g., first cohort's computer 152 shown in FIG. 1) or a remote system (e.g., cohort candidate database server 156). In one embodiment, this mapping includes adding a tag to the entry for the paradigmatic member for ease of future retrieval. For example, assume that, based on the known first agenda and constraints on the first cohort, members of the first cohort hold a individual interest in public beautification (which is pre-defined as including painting building murals, planting trees in public spaces, picking up garbage from public spaces and roadways, working to restrict billboard locations, etc.). A tag, such as a descriptor text "public beautification", is added to the entry for the paradigmatic member. Thus, when another cohort, which is devoted to public beautification in any of the exemplary embodiments just described, is searching for new members, that other cohort may search for the tag "public beautification" to locate the appropriate paradigmatic member model.

Referring now to block 210, a second agenda of a second cohort that has an enrollment need is identified. This second cohort may be the same cohort as the first cohort, or it may be a different cohort. In either case, members are needed by the second cohort. As described in block 212, the second agenda of the second cohort is compared to the first agenda of the first cohort, in order to determine if the paradigmatic member derived from the first cohort is a good model of a member of the second cohort. For example, consider Table 500 shown in FIG. 5, which identifies various agenda subcomponents for the first cohort (Cohort I) and the second cohort (Cohort II). As depicted in rows 502, these two cohorts share three out of four agenda subcomponents. Thus, it is assumed that members of Cohort I will be good members of Cohort II, subject to any constraints (i.e., geographic, licensing, etc.) that may be imposed on Cohort II, and thus the paradigmatic member derived from Cohort I will be a good model for candidate members of Cohort II. If a predetermination has been made that a 75% match of agenda subcomponents indicates an agenda match between the two cohorts (query block 214), then enrollment candidates for the second cohort are located based on the paradigmatic member derived from Cohort I (block 216). These enrollment candidates are persons who hold the common non-linear attributes of the paradigmatic member derived from Cohort I. As described in block 218, information is provided to the second cohort (e.g., to the second cohort's computer 154 shown in FIG. 1) about how to contact/enroll/identify these enrollment candidates. If a particular enrollment candidate meets any constraint that may be on the second cohort, which may be the same or different as the constraint on the first cohort described above, then the candidate can be invited/assigned to that second cohort. For example, a constraint on the second cohort may be defined as a requirement that a member of the second cohort be a member of an organization that is devoted to the first agenda of the first cohort. The process ends at terminator block 220.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of populating a task directed community, the computer implemented method comprising:

a processor identifying non-linear attributes of each member of a first cohort, wherein the first cohort is a task directed community that has a first agenda, and wherein each of the non-linear attributes is individually unrelated to the first agenda;

the processor identifying common non-linear attributes that are shared by multiple members of the first cohort;

the processor defining a paradigmatic member of the first cohort based on the common non-linear attributes of the members of the first cohort and at least one constraint on the first cohort;

the processor mapping the paradigmatic member of the first cohort to the common non-linear attributes of the members of the first cohort and said at least one constraint on the first cohort for storage of same;

the processor identifying a second agenda of a second cohort;

the processor comparing the second agenda to the first agenda;

the processor executing a Bayesian analysis to determine enrollment candidates to the second cohort, wherein the Bayesian analysis is performed by executing the formula:

$$P(A\mid B) = \frac{P(B\mid A) * P(A)}{P(B)}$$

where: P(A|B) is a probability that a candidate person will meet cohort requirements of the second cohort (A) given (|) that the candidate person has same attributes as the paradigmatic member (B) of the first cohort, where (|) is a conditional operator representing A given a condition B; P(B|A) is a probability that a known member of the first cohort has same attributes as the paradigmatic member (B) of the first cohort; P(A) is a probability that the candidate person will meet the cohort requirements of the second cohort regardless of any other information; and P(B) is a probability that the candidate person will have the same attributes as the paradigmatic member regardless of any other information;

the processor, in response to the first agenda matching the second agenda within predefined bounds, locating enrollment candidates for the second cohort, wherein the enrollment candidates hold the common non-linear attributes that are mapped to the paradigmatic member of the first cohort; and the processor, subject to at least one constraint on the second cohort, providing information describing the located enrollment candidates to the second cohort.

2. The computer implemented method of claim 1, further comprising:

the processor defining the paradigmatic member by applying a stochastic algorithm to the common non-linear attributes of the members of the first cohort.

3. The computer implemented method of claim 1, further comprising:

the processor retrieving the non-linear attributes of the members of the first cohort from a public database.

4. The computer implemented method of claim 1, further comprising:

the processor defining a minimum number of common non-linear attributes for members of the first cohort; and the processor limiting a definition of the paradigmatic member to a person holding at least the defined minimum number of common non-linear attributes.

5. The computer implemented method of claim 1, wherein said at least one constraint on the first cohort is a same constraint as said at least one constraint on the second cohort.

6. The computer implemented method of claim 1, further comprising:

the processor defining said at least one constraint on the second cohort as a requirement that a member of the second cohort be a member of an organization that is devoted to the first agenda of the first cohort.

7. The computer implemented method of claim 1, further comprising:

the processor assigning a descriptor text to the paradigmatic member, wherein the descriptor text describes an area of individual interest held by the paradigmatic member; and the processor utilizing the descriptor text to locate the paradigmatic member for use in identifying said enrollment candidates from a pool of enrollment candidates for the second cohort.

8. The computer implemented method of claim 1, wherein said at least one constraint on the first cohort is that members of the first cohort are older than a predetermined age.

9. The computer implemented method of claim 1, further comprising:

the processor deducing the first agenda from a mission statement of the first cohort, press releases from the first cohort, an affiliation between the first cohort and other organizations, a website of the first cohort, publications of members of the first cohort, and conferences hosted by the first cohort.

10. A computer program product for defining a paradigmatic member of a task directed community, the computer program product comprising:

a computer readable storage medium;

first program instructions executable by a processor to cause the processor to identify non-linear attributes of each member of a first cohort, wherein the first cohort is a task directed community that has a first agenda, and wherein each of the non-linear attributes is individually unrelated to the first agenda;

second program instructions executable by the processor to cause the processor to identify common non-linear attributes that are shared by multiple members of the first cohort;

third program instructions executable by the processor to cause the processor to define a paradigmatic member of the first cohort based on the common non-linear attributes of the members of the first cohort and at least one constraint on the first cohort;

fourth program instructions executable by the processor to cause the processor to map the paradigmatic member of the first cohort to the common non-linear attributes of the members of the first cohort and said at least one constraint on the first cohort for storage of same;

fifth program instructions executable by the processor to cause the processor to identify a second agenda of a second cohort;

sixth program instructions executable by the processor to cause the processor to compare the second agenda to the first agenda;

seventh program instructions to execute a Bayesian analysis to determine enrollment candidates to the second cohort, wherein the Bayesian analysis is performed by executing the formula:

$$P(A \mid B) = \frac{P(B \mid A) * P(A)}{P(B)}$$

where: P(A|B) is a probability that a candidate person will meet cohort requirements of the second cohort (A) given (|) that the candidate person has same attributes as the paradigmatic member (B) of the first cohort, where (|) is a conditional operator representing A given a condition B; P(B|A) is a probability that a known member of the first cohort has same attributes as the paradigmatic member (B) of the first cohort; P(A) is a probability that the candidate person will meet the cohort requirements of the second cohort regardless of any other information; and P(B) is a probability that the candidate person will have the same attributes as the paradigmatic member regardless of any other information;

eighth program instructions executable by the processor to cause the processor to, in response to the first agenda matching the second agenda within predefined bounds, locate enrollment candidates for the second cohort, wherein the enrollment candidates hold the common non-linear attributes that are mapped to the paradigmatic member of the first cohort; and ninth program instructions executable by the processor to cause the processor to, subject to at least one constraint on the second cohort, provide information describing the located enrollment candidates to the second cohort; and wherein the first, second, third, fourth, fifth, sixth, seventh, eighth, and ninth program instructions are stored on the computer readable storage medium.

11. The computer program product of claim 10, further comprising:

tenth program instructions executable by the processor to cause the processor to retrieve the non-linear attributes of the members of the first cohort from a public database; and wherein the tenth program instructions are stored on the computer readable storage medium.

12. The computer program product of claim 10, further comprising:

tenth program instructions executable by the processor to cause the processor to define a minimum number of common non-linear attributes for members of the first cohort; and eleventh program instructions executable by the processor to cause the processor to limit a definition of the paradigmatic member to a person holding at least the defined minimum number of common non-linear attributes; and wherein the tenth and eleventh program instructions are stored on the computer readable storage medium.

13. The computer program product of claim 10, wherein said at least one constraint on the first cohort is a same constraint as said at least one constraint on the second cohort.

14. The computer program product of claim 10, further comprising:
    tenth program instructions executable by the processor to cause the processor to define said at least one constraint as a requirement that a member of the first cohort reside within a predetermined distance from a meeting place for the first cohort; and wherein
the tenth program instructions are stored on the computer readable storage medium.

15. The computer program product of claim 10, further comprising:
    tenth program instructions executable by the processor to cause the processor to define said at least one constraint on the second cohort as a requirement that a member of the second cohort be a member of an organization that is devoted to the first agenda of the first cohort; and wherein
the tenth program instructions are stored on the computer readable storage medium.

16. The computer program product of claim 10, further comprising:
    tenth program instructions executable by the processor to cause the processor to assign a descriptor text to the paradigmatic member, wherein the descriptor text describes an area of individual interest held by the paradigmatic member; and wherein
the tenth program instructions are stored on the computer readable storage medium.

17. A computer system comprising:
    a central processing unit (CPU), a computer readable memory, and a computer readable storage media;
    first program instructions to identify non-linear attributes of each member of a first cohort, wherein the first cohort is a task directed community that has a first agenda, and wherein each of the non-linear attributes is individually unrelated to the first agenda;
    second program instructions to identify common non-linear attributes that are shared by multiple members of the first cohort;
    third program instructions to define a paradigmatic member of the first cohort based on the common non-linear attributes of the members of the first cohort and at least one constraint on the first cohort;
    fourth program instructions to map the paradigmatic member of the first cohort to the common non-linear attributes of the members of the first cohort and said at least one constraint on the first cohort for storage of same;
    fifth program instructions to identify a second agenda of a second cohort;
    sixth program instructions to compare the second agenda to the first agenda;
    seventh program instructions to execute a Bayesian analysis to determine enrollment candidates to the second cohort, wherein the Bayesian analysis is performed by executing the formula:

$$P(A\mid B) = \frac{P(B\mid A) * P(A)}{P(B)}$$

where: P(A|B) is a probability that a candidate person will meet cohort requirements of the second cohort (A) given (|) that the candidate person has same attributes as the paradigmatic member (B) of the first cohort, where (|) is a conditional operator representing A given a condition B; P(B|A) is a probability that a known member of the first cohort has same attributes as the paradigmatic member (B) of the first cohort; P(A) is a probability that the candidate person will meet the cohort requirements of the second cohort regardless of any other information; and P(B) is a probability that the candidate person will have the same attributes as the paradigmatic member regardless of any other information;
    eighth program instructions executable by the processor to cause the processor to, in response to the first agenda matching the second agenda within predefined bounds, locate enrollment candidates for the second cohort, wherein the enrollment candidates hold the common non-linear attributes that are mapped to the paradigmatic member of the first cohort; and
    ninth program instructions executable by the processor to cause the processor to, subject to at least one constraint on the second cohort, provide information describing the located enrollment candidates to the second cohort; and wherein
the first, second, third, fourth, fifth, sixth, seventh, eighth, and ninth program instructions are stored on the computer readable storage medium for execution by the CPU via the computer readable memory.

18. The computer system of claim 17, further comprising:
    tenth program instructions to retrieve the non-linear attributes of the members of the first cohort from a public database; and wherein
the tenth program instructions are stored on the computer readable storage media for execution by the CPU via the computer readable memory.

19. The computer system of claim 17, further comprising:
    tenth program instructions to define a minimum number of common non-linear attributes for members of the first cohort; and
    eleventh program instructions to limit a definition of the paradigmatic member to a person holding at least the defined minimum number of common non-linear attributes; and wherein
the tenth and eleventh program instructions are stored on the computer readable storage media for execution by the CPU via the computer readable memory.

* * * * *